United States Patent

Koff

[15] 3,647,313
[45] Mar. 7, 1972

[54] GAS TURBINE ENGINES WITH COMPRESSOR ROTOR COOLING

[72] Inventor: Bernard L. Koff, Cincinnati, Ohio
[73] Assignee: General Electric Company
[22] Filed: June 1, 1970
[21] Appl. No.: 41,958

[52] U.S. Cl. ............................. 415/115, 415/116, 415/175, 184/6.11
[51] Int. Cl. ................... F01d 5/14, F03b 11/00, F04d 29/38
[58] Field of Search .............. 415/115, 116, 175, 53; 416/96; 60/39.66

[56] References Cited

UNITED STATES PATENTS

| 3,453,825 | 7/1969 | May et al. ........................ 60/39.66 X |
| 2,933,238 | 4/1960 | Stalker ............................. 415/115 X |
| 3,031,132 | 4/1962 | Davies ............................. 415/115 X |
| 3,123,283 | 3/1964 | Leis ................................. 415/115 |
| 2,910,268 | 10/1959 | Davies et al. .................... 415/115 |
| 2,973,938 | 3/1961 | Alford ............................. 416/96 |

*Primary Examiner*—Carlton R. Croyle
*Assistant Examiner*—Richard E. Gluck
*Attorney*—Derek P. Lawrence, E. S. Lee, III, Lee H. Sachs, Frank L. Neuhauser, Oscar B. Waddell and Joseph B. Forman

[57] ABSTRACT

The disclosure shows a system for cooling the rotor of an axial flow compressor incorporated in a gas turbine engine. Air is ducted from the first compressor stage discharge into the interior of the rotor. This cooling air flows to the downstream end of the rotor and is then ducted back into the compressor inlet.

9 Claims, 4 Drawing Figures

PATENTED MAR 7 1972 3,647,313
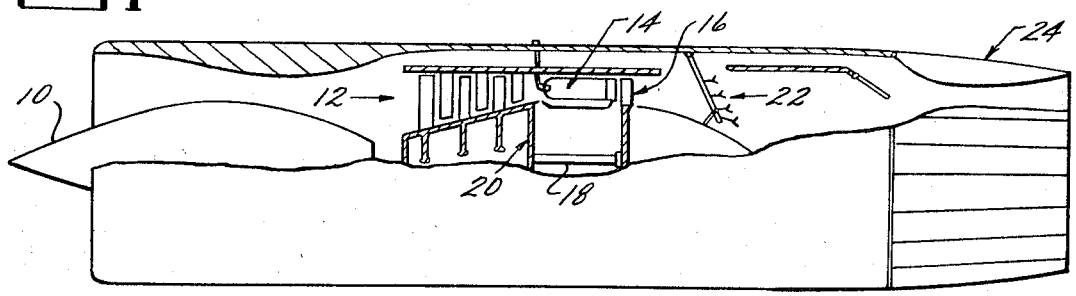
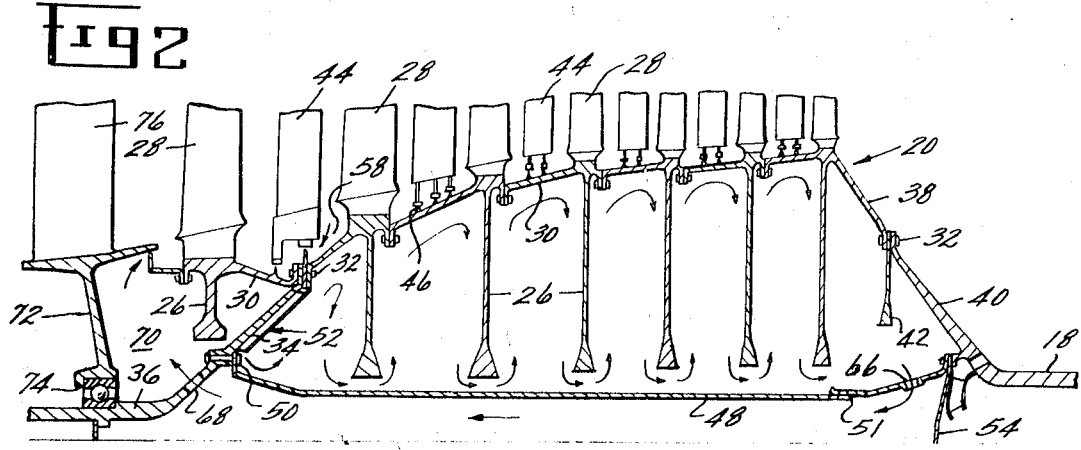
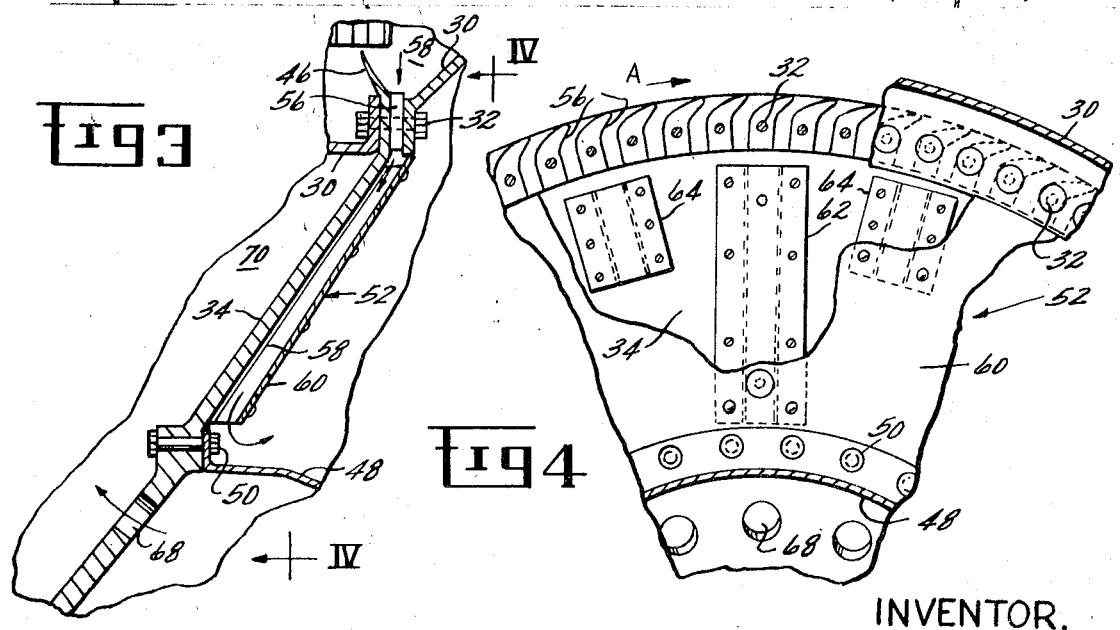
INVENTOR.
BERNARD L. KOFF
ATTORNEY

GAS TURBINE ENGINES WITH COMPRESSOR ROTOR COOLING

The invention described and claimed in the U.S. Pat. application herein resulted from work done under U.S. Government contract FA-SS-66-6. The U.S. Government has an irrevocable, nonexclusive license under said application to practice and have practiced the invention claimed herein, including the unlimited right to sublicense others to practice and have practiced the claimed invention for any purpose whatsoever.

The present invention relates to improvements in gas turbine engines and, more particularly, to improved cooling of compressor rotors employed in such engines.

The present invention, while not so limited in its broader aspects, is particularly motivated by the unique requirements of turbojet engines employed in the supersonic propulsion of aircraft. When operating at supersonic flight conditions, air enters the engine inlet and is shocked down to subsonic velocities. This air is then pressurized by a compressor to support combustion of fuel in the generation of a high energy hot gas stream. The temperature rise of the air through the inlet and the compressor results in extremely high temperatures in the compressor and at the discharge thereof the temperature levels are comparable to those of the hot gas or combustion streams of earlier gas turbine engines.

The high-temperature levels of the compressor have a serious effect on obtaining high-performance operation with a lightweight construction requisite for aircraft propulsion. The very fact that temperatures are at such high levels markedly reduces the strength of the materials from which the compressor components are fabricated. This is most critical in the compressor rotor which must rotate at high speeds. Additionally, thermal gradients in the rotor components induce further stresses. These factors all tend to increase the amount of material in the rotor for sufficient strength and thus to increase its weight. These problems are further complicated in large diameter engines required to develop sufficient thrust for transport aircraft.

Another factor of high-temperature operation is thermal growth. The greater the operating temperature, the larger the radial growth of the tips of the blades mounted on the rotor. Because the casing of the compressor can have a different thermal growth under certain operating conditions, it is difficult to obtain the desired minimum clearance between the tips of the blades and the surrounding shrouds mounted on the casing. These problems can be reduced by minimizing the operating temperature of the rotor.

A further problem area, not directly related to temperature levels, is the high hoop stresses generated in the annular bands or spacers of such rotors. These spacers are loaded in a hoop sense by the centrifugal forces generated by the high-speed rotation of the rotor.

While it has previously been proposed to cool turbine as well as compressor rotors to alleviate the problems discussed above, such prior proposals are not fully effective, particularly for application to cooling of compressor rotors incorporated in turbojet engines employed in supersonic propulsion.

Accordingly, one object of the invention is to provide improved cooling of compressor rotors with low-pressure air which additionally reduces the stress levels of the rotor.

Another object of the invention is to accomplish the above ends and in so doing, provide a lightweight rotor, long-life construction consistent with the requirements of aircraft propulsion engines.

A further object is to provide improved cooling of compressor rotors and in so doing to minimize clearances between the tips of the rotor blades and the surrounding shrouds mounted on the compressor casings.

The above ends are attained, in accordance with the broader aspects of the invention, by a multistage axial flow compressor comprising a casing and a rotor defining the outer and inner bounds respectively of an annular flow path. The casing has vanes disposed in axially spaced circumferential rows and the rotor has rows of blades projecting between the vane rows. The blades and vanes pressurize air in a progressive fashion as it moves along the flow path. The rotor includes a generally cylindrical shell having thin-walled end section with at least a portion of the blade rows being mounted on the shell. Means are provided for directing air from a region of the flow path having a given pressure level into the upstream end portion of the shell's interior. Further, means are provided for ducting air from the downstream portion of the shell's interior to and into a region of the flow path having a lower pressure level than the given pressure level. In this fashion, the rotor is efficiently and effectively cooled while providing a reduced pressure which minimizes hoop loadings in the shell.

Additional features of the invention are found in the provision of a cylindrical shell which includes axially spaced annular discs projecting into the interior thereof and relatively thin annular spacers separating the discs. The blades are mounted around the peripheries of at least some of these discs. The discs in combination with the end sections and each other respectively form annular chambers. Air directed into the most upstream of these chambers passes sequentially from chamber to chamber to the ducting means.

Another feature of the invention is found in the utilization of a central tube extending between the end sections of the shell as a component of the ducting means for the rotor. The tube has openings into the most downstream chamber within the shell, means for blocking the downstream end of the tube and passageway means from the upstream end of the tube to the flow path.

Further, the means for directing air into the shell preferably are provided adjacent the inner bounds of the flow path and extend in a radial direction through the upstream end section of the shell. Impeller means are desirably provided to direct the air radially inwardly to a diameter approximating that of the adjacent annular disc when such discs are incorporated in the rotor. Further efficiency is obtained by providing a shroud for the impeller.

More specific features of the invention include the provision of conical end sections for the rotor shell. A first stage disc may be secured in spaced relationship from the upstream end section by an annular spacer. The further disc would be bladed and form the first rotor stage of the compressor. The air ducted into the interior of the rotor would be derived from the first stage of compression and then ducted back into the flow path upstream of the first stage.

The above and other related objects and features of the invention will be apparent from a reading of the following description of the disclosure found in the accompanying drawing and the novelty thereof pointed out in the appended claims.

In the drawing:

FIG. 1 is a schematic depiction of a gas turbine engine;

FIG. 2 is an enlarged longitudinal section of the compressor seen in FIG. 1;

FIG. 3 is a longitudinal section of the forward portion of the compressor seen in FIG. 2, on a further enlarged scale; and FIG. 4 is a section taken generally on line IV—IV in FIG. 3.

FIG. 1 schematically illustrates a gas turbine engine of the type employed for supersonic flight. Air enters an inlet comprising a spike 10 and then is compressed in a multistage axial flow compressor 12. This compressed air supports combustion of fuel in a combustor 14 to generate a hot gas stream. The hot gas stream drives a turbine 16 which in turn, through a shaft 18, powers the rotor 20 of the compressor 12. The energy level of the hot gas stream may then be augmented by the combustion of further fuel in an augmenter or afterburner 22. The hot gas stream is then discharged from a variable area convergent-divergent nozzle 24 to provide the necessary thrust for supersonic flight. In subsonic flight operation, the hot gas stream may or may not be augmented in the afterburner and the nozzle may be adjusted to other than the illustrated convergent-divergent configuration.

FIG. 2 illustrates the composite fabrication of the rotor 20 in greater detail. This rotor comprises a series of discs 26 around the peripheries of which are mounted blades 28 constituting the several rows or stages of the compressor rotor. Each disc also has an annular spacer 30 which, with the exception of the first and second stage discs, is connected to the adjacent upstream disc 26 by bolts 32. The spacers 30 of the first and second stage discs and the conical portion 34 of a hollow shaft 36 have flanges (see also FIG. 3) which are secured together by further bolts 32 with the flange of the cone portion 34 sandwiched in the middle. The last stage disc 26 also has an integral conical flange 38 which is secured to the conical portion 40 of the shaft 18 by bolts 32. A disc 42 is interposed between the flange 38 and the conical portion 40 to provide greater strength and rigidity for this bolted connection. The described rotor thus comprises a generally cylindrical shell having annular discs projecting into its interior and conical end sections with the first stage disc secured to the upstream end section.

The annular spacers 30 space the rotating blade rows so that stationary rows of vanes 44, supported by the compressor casing, may be mounted therebetween. These vanes turn the air in a known fashion to give it a proper angle of attack on the next succeeding blade row. Labyrinth-type seals 46 are provided between the vane rows and the spacers 30. A tubular duct 48 is secured at one end to the conical portion 34 by bolts 50 and supported on the flange 40 by a slip joint 51. A shrouded impeller 52 (to be described in greater detail below) is secured to the inner surface of the conical rotor portion 34. An end plate 54 closes off the downstream end of the duct 48.

Referencing FIGS. 3 and 4, it will be seen that a labyrinth seal tooth 46 is formed integrally with the cone portion 34. A plurality of radial slots 56 are formed in the flange of conical portion 34 downstream of the seal tooth 46. These slots open into a chamber 58 intermediate the first stage stator vanes 44 and the second stage rotor blades 28. The slots 56 are curved at their outer ends in the direction of rotor rotation which is indicated by the arrow A. Thus, first stage pressurized air is directed inwardly along the inner surface of the cone portion 34 by the shrouded impeller 52. The latter includes a pair of sheet metal cones 58 and 60 which are held in spaced relationship by sheet metal impellers 62 and 64. The outer sheet metal cone 60 extends to the base of the flange on the second stage disc spacer 30 and adjacent to the duct 48, thus pressurized air is taken into the center of the hollow rotor 20 to a diameter approximating that of the bore of the adjacent disc 26. This pressurized air pressurizes the chamber on the upstream side of the second stage disc 26 and is forced into the next succeeding chamber between the adjacent discs 26 of the second and third stages. As the pressurized air enters this next chamber, centrifugal force tends to displace the air radially outwardly causing it to flow to the spacer 30. As the air flows along this path, it becomes heated and by reason of being heated has lesser density, so that it will flow radially inwardly into the next successive chamber between the next successive pair of discs 26. As air enters each of these chambers, it again is cooler than the air in the chamber and a flow path is created in the fashion indicated by the arrows in FIG. 2. After passing into the chamber defined by the bolt disc 42 and the cone portion 40, the air then enters holes 66 to flow in an upstream direction through the tube 48. The air then is discharged through holes 68 in the conical portion 34 of stub shaft 36 to enter a chamber 70 defined by the first stage disc and the cone portion 34, as well as a stationary front frame 72 which supports the bearing 74 for the stub shaft 36. The air then flows from the chamber 70 back into the compressor 12 between inlet guide vanes 76 and the first stage rotor blades 28.

The air discharged back into the compressor becomes mixed with the entering inlet air so that it may dissipate the heat that has been absorbed before being recirculated into the described cooling system.

The described cooling system is highly effective in maintaining uniform temperature distributions in the disc 26 of the several compressor stages as well as the disc 42. The flow path through the compressor becomes increasingly hotter toward its discharge end. The cooling air in the initial stages of the compressor maintains the temperature of the discs essentially uniform from the rims thereof which are disposed in the compressor chamber and their bores within the interior of the rotor. In the latter stages of the compressor, the discs themselves are reduced in temperature to a substantial degree and yet not to a degree which would cause an excessive thermal gradient between the interior portions of the discs and the rim portion. It will also be noted that the forward flowing air within the duct 48 is at the highest temperature and that in effect a heat transfer is obtained between the cooling air flowing into the successive chambers between the discs 26 and the return air through the duct 48. This factor is beneficial in reducing the temperature of the return air which is to be returned to the compressor system. In other words, the hotter the air is when it is returned to the compressor system, the greater the energy loss involved.

Another factor to be noted is that the interior of the rotor is vented to a substantially lower pressure than is exerted on the outer surfaces of the spacers 30 for the latter compressor stages in particular. Since the rotational force field is radially outwardly, a restraining pressure is created which substantially reduces the stress levels in the spacer components, all toward the end of reducing their thickness and weight. The same is true, of course, in that reducing the operating temperature of the discs 26 increases their strength to enable a lighter weight construction.

Various modifications of the described cooling system will occur to those skilled in the art within the spirit and scope of the present inventive concepts, which are therefore to be derived solely from the following claims.

Having thus described the invention what is claimed as novel and desired to be secured by Letters Patent of the United States is:

1. A multistage axial flow compressor comprising:
    a casing defining the outer bounds of an annular flow path for air being pressurized, said casing having vanes disposed in axially spaced circumferential rows,
    a rotor defining the inner bounds of the annular flow path, said rotor having blades mounted thereon in axially spaced circumferential rows, said blade rows projecting between said vane rows and cooperating therewith to progressively pressurize air in said flow path, said rotor including a generally cylindrical shell having thin-walled end sections, with at least a portion of said blades being mounted on said shell, said generally cylindrical shell including axially spaced annular discs projecting into the interior thereof and, relatively thin annular spacers separating said discs, said blades being mounted around the peripheries of at least some of the discs, said discs in combination with said end sections and each other respectively, forming annular chambers,
    means for directing air from a region of the flow path having a given pressure level, into the most upstream of said chambers within the shell's interior, and
    means for ducting said air from the downstream end portion of the shell's interior to and into a region of the flow path having a lower pressure level than said given level.

2. A multistage axial flow compressor as in claim 1 wherein, said ducting means comprises a central tube extending between the end sections of said shell, said tube having openings into the most downstream chamber within said shell, means for blocking the downstream end of said tube and passageway means from the upstream end of said tube to said flow path.

3. A multistage axial flow compressor as in claim 1 wherein, the directing means include passageways extending generally radially through the upstream end section of said shell at a distance adjacent to inner bounds of said flow path, and
    impeller means for directing the air radially inwardly approximately to the diameter of the bore of the adjacent disc.

4. An axial flow compressor as in claim 4 wherein, the impeller means are secured to the upstream end section and have a shroud secured thereto in spaced relation from said upstream end section, and further wherein the inlet portions of the passageways through the upstream end section are curved in the direction of rotor rotation.

5. A multistage axial flow compressor as in claim 1 wherein, the end sections of the rotor are conical, a further disc is secured to and spaced upstream from the upstream conical end section by an annular spacer and a plurality of blades are mounted around the periphery of said further disc to form the first rotor stage of the compressor, sealing means are provided between the rotor and the vane row downstream of said first rotor stage, and the air-directing means comprise passageways through said upstream end section downstream of the named sealing means, and the ducting means comprises a central tube extending between the end sections of said shell, said tube having openings into the most downstream chamber within said shell, means for blocking the downstream end of said tube and passageway means extending through the upstream end of said tube, through said rotor, to the upstream side of said further disc.

6. A multistage axial flow compressor as in claim 5 wherein, impeller means are provided for directing air radially inwardly, from the passageways through the end section of said shell, approximately to the diameter of the bore of the adjacent disc.

7. An axial flow compressor as in claim 6 wherein, the upstream conical end section is formed by a conical portion formed integrally with a stub shaft and an outer conical portion formed integrally with said adjacent disc, said conical portions and the spacer of said further disc having radial flanges bolted together with the flange of the inner conical portion between the other two flanges, and the air-directing passageways are formed in said inner conical portion flange.

8. An axial flow compressor as in claim 7 wherein, a conical shroud is secured to said impeller means and extends in spaced relationship from the inner surface of said inner conical portion from the outer conical portion flange to a diameter spaced from said tube.

9. A multistage axial flow compressor as in claim 8 wherein, the entrances to the radial passageways through said inner cone flange are curved in the direction of rotor rotation, and wherein the impeller means include a plurality of angularly spaced impellers extending from said inner cone flange to the inner diameter of the shroud cone and a plurality of shorter impellers extending from said cone flange partially toward said shroud cone inner diameter.

* * * * *